United States Patent [19]

Orain et al.

[11] Patent Number: 4,921,759

[45] Date of Patent: May 1, 1990

[54] HIGH OPTICAL QUALITY TRANSPARENT SHEET OF PLASTIC WHICH IS SCRATCH- AND ABRASION-RESISTANT, METHOD OF MANUFACTURING THE SAME AND GLAZINGS USING THE SAME

[75] Inventors: Roger Orain, Garches; Jean-Louis Bravet, Thourotte; Gerard Dimier, Talence; Philippe Dagaut; Gerard Daude, both of Villenave D'Ornon, all of France

[73] Assignee: Saint-Gobain Vitrage, Courbevoie, France

[21] Appl. No.: 135,391

[22] Filed: Dec. 21, 1987

[30] Foreign Application Priority Data

Dec. 19, 1986 [FR] France ................................ 86 17804

[51] Int. Cl.$^5$ .............................................. B32B 27/00
[52] U.S. Cl. ................................ 428/424.4; 428/422.8; 428/425.6; 264/130; 264/135; 264/299; 264/300; 264/331.19; 264/331.18
[58] Field of Search .................. 428/423.1, 424.4, 420, 428/422.8, 425.6; 264/130, 135, 299, 300, 331.19, 331.18

[56] References Cited

U.S. PATENT DOCUMENTS

| | | | |
|---|---|---|---|
| 3,810,815 | 5/1974 | Welhart | 156/104 |
| 3,971,864 | 7/1976 | Beestrice | 428/423.1 |
| 4,010,311 | 3/1977 | Lewis | 428/423.1 |
| 4,045,269 | 8/1977 | Voss | 428/423.1 |
| 4,177,099 | 12/1979 | Radzwill | 428/424.4 |
| 4,342,860 | 8/1982 | Locatelli | 428/423.1 |
| 4,355,077 | 10/1982 | Chevreau | 428/423.1 |
| 4,423,185 | 12/1983 | Matsumoto | 428/423.1 |
| 4,594,290 | 6/1986 | Fischer | 428/424.4 |
| 4,629,637 | 12/1986 | Waldenrath | 428/423.1 |
| 4,652,494 | 3/1987 | Bravet | 428/423.1 |
| 4,671,838 | 6/1987 | Bravet | 428/423.1 |
| 4,675,237 | 6/1987 | Bravet | 428/423.1 |
| 4,705,721 | 11/1987 | Frisch | 428/423.1 |
| 4,731,289 | 3/1988 | Coleman | 428/423.1 |
| 4,741,961 | 5/1988 | Frisch | 428/423.1 |
| 4,830,806 | 5/1989 | Daude et al. | 264/216 |

FOREIGN PATENT DOCUMENTS 144065 1/1986 European Pat. Off. .
190700 8/1986 European Pat. Off. .

*Primary Examiner*—Jay H. Woo
*Assistant Examiner*—Jeremiah F. Durkin, II
*Attorney, Agent, or Firm*—Oblon, Spivak, McClelland, Maier & Neustadt

[57] ABSTRACT

A high optical quality transparent plastic sheet having a polyurethane layer formed by reactive pouring or reactive pulverization onto a flat horizontal support of a reaction mixture containing a polyol component and an isocyanate component, with the surface of the polyurethane layer which was facing the support during the formation of the layer containing an acrylic polymer resulting from the contact, during deposition of the reaction mixture, of the reaction mixture with a thin acrylic layer previously deposited on the support. The acrylic layer and the polyurethane layer are interpenetrated.

12 Claims, No Drawings

HIGH OPTICAL QUALITY TRANSPARENT SHEET OF PLASTIC WHICH IS SCRATCH- AND ABRASION-RESISTANT, METHOD OF MANUFACTURING THE SAME AND GLAZINGS USING THE SAME

BACKGROUND OF THE INVENTION

1. Field of the Invention:

This invention relates to a high optical quality transparent sheet of plastic containing at least one base layer of a polyurethane with energy-absorbing properties, which can be used alone or in combination with other materials, in particular, in laminated glazings, where it is combined with a monolithic or laminated glass and/or plastic support such as a vehicle windshield.

2. Description of the Background:

A high optical quality transparent sheet is known from European Patent Publication No. 0 133 090 which sheet can be used alone or in association with other materials particularly in the manufacture of laminated glazings. This sheet contains a layer formed in a continuous process by reactive pouring onto a flat horizontal support, from which it is detachable, of a reaction mixture of polyurethane components. The term "reactive pouring" means pouring in the form of a layer or a film of a liquid mixture of the components in the monomeric or prepolymeric state, following by the polymerization of said mixture using heat.

The reaction mixture described in the above publication contains a component with active hydrogens, in particular a polyol component, and an isocyanate component containing at least one aliphatic or cycloaliphatic diisocyanate or a diisocyanate prepolymer, with this component having a viscosity of below approximately 5000 centipoises at $+40°$ C. The polyol component contains at least one difunctional long polyol with a molecular weight of between 500 and 4000, at least one short diol as a chain extending agent and, as necessary, a small amount of at least one polyol with a functionality of greater than two, in particular aliphatic triols.

The proportions of the long polyol, the short diol and optionally the polyol with a functionality of greater than 2 are generally selected such that for a hydroxyl equivalent, the long polyol represents approximately from 0.30 to 0.45 equivalent, the short diol approximately 0.2 to 0.7 equivalent and the polyol with a functionality of greater than 2 approximately 0 to 0.35 equivalent. Under these circumstances, the layer has the following mechanical characteristics, measured in accordance with AFNOR/NFT norms 46 002, 51 034 and 54 108.

a flow threshold stress $\sigma_y$ at $-20°$ C. less than or equal to 3 daN/mm$_2$, a breakage stress $\sigma R$ at $+40°$ C. greater than or equal to 2 daN/mm$_2$, a stretching to breakage $\epsilon_R$ at $+20°$ C. of between 250 and 500%, a resistance to primed tearing Ra at $+20°$ C. greater than or equal to 9 daN/mm of thickness.

In addition to energy-absorbing properties, as indicated above, this layer has scratch- and abrasion-resistant properties which render it capable of being used as an external layer under certain conditions. Thus, it has a scratch-resistance of greater than 20 grams and an abrasion-resistance with a blur separation of less than 4%, said values being measured in accordance with the tests described in the cited publication.

However, under severe conditions of use, for example when it is used as the external layer in motor vehicle glazings where it is subjected to attack, particularly from certain cleaning products containing aggressive organic solvents, it does not given complete satisfaction, since its resistance to these products is not satisfactory.

One solution proposed to improve the resistance of the layer, in particular to solvents, is to provide the layer with a coating layer of a heat-hardenable polyurethane with a modulus of elasticity of approximately 25 to 200 daN/cm2 and a stretching of approximately 100 to 200% with less than 1% plastic deformation.

Another solution, proposed in European Patent Publication No. 0 190 700 consists of "reforming" the external surface of an already formed polyurethane layer by impregnation of the surface of the polyurethane layer with an unsaturated, polymerizable compound, and then polymerizing this compound on the surface of the polyurethane layer. This method, however, is difficult to use because the surface layer formed after polymerization of the unsaturated compound must not exceed 1 micrometer in thickness in order not to destroy the auto-cicatrizing properties of the polyurethane layer. Thus, this method is very delicate. It is therefore necessary to use very precise tempering sequences in order to obtain the desired thickness. In addition, this method is lengthy because it necessitates a cycle for the polymerization of the polyurethane layer and an additional cycle for the polymerization of the acrylic surface layer.

Thus, a need continues to exist for a high optical quality transparent plastic sheet having an energy-absorbing polyurethane layer, which has the necessary properties required for use as an external layer in safety glazings which can be manufactured in a simple manner.

SUMMARY OF THE INVENTION

Accordingly, it is an object of the present invention to provide a simple method for the manufacture of a high optical quality transparent plastic sheet having an energy-absorbing polyurethane layer, which has the necessary properties required for use as an external layer in safety glazings.

It is also an object of this invention to provide a high optical quality transparent plastic sheet produced in accordance with the above method.

Moreover, it is also an object of this invention to provide a laminated glazing containing a laminated glass or plastic support, which uses the high optical quality transparent plastic sheet.

DETAILED DESCRIPTION OF THE PREFERRED EMBODIMENTS

The present invention proposes a sheet of plastic containing a polyurethane layer having energy-absorbing properties which has the properties required for use, in particular, as an external layer in safety glazings, while being manufactured by a simplified method.

The polyurethane layer in accordance with the present invention is formed by deposit on a flat horizontal support, by reactive pouring or reactive pulverization, of a reaction mixture containing a polyol component and an isocyanate component as described above, and is characterized in that it contains on the surface facing the support, during the formation of the layer, an acrylic polymer resulting from contacting, during the deposit of the reaction mixture, the reaction mixture with a thin acrylic layer previously deposited on the support.

The polyurethane layer in accordance with the present invention therefore superficially has a structure which is interpenetrated with polyurethane and acrylic polymer.

In actuality, a surface-covering layer of the acrylic polymer is not observed, or indeed this layer, if it exists, is very fine and at most a few micrometers in thickness.

The method of manufacture of the sheet in accordance with this invention entails forming on a flat horizontal support, which has been previously coated with a separation agent, a thin coating layer based on monomers, acrylic prepolymers or acrylic polymers containing free hydroxyl groups, and then depositing on this coating the reaction mixture of components capable of forming the polyurethane layer, subjecting the entirety to a polymerization cycle during which the polymerization of the acrylics and the polyurethane layer occurs in the presence of an acrylic polymerization primer using heat treatment, and then removing from the support the polyurethane layer superficially combined with the acrylic polymer.

The monomers and/or prepolymers used to form the thin coating layer on the casting support are selected in particular from among acrylates and methacrylates, polyacrylates and polymethacrylates having a lower molecular weight, for example isobutyl methacrylate, dipropyleneglycol diacrylate, triethyleneglycol diacrylate, 1,6-hexanediol diacrylate, and 1,4-butanediol diacrylate.

When the coating is formed from acrylic polymers containing free hydroxyl groups, methacrylic resins, such as methacrylates with a hydroxyl index of less than 100, are advantageously used.

When methacrylic resins having a hydroxyl index of greater than 100 are used, hard, chemical-resistant but scratchable surfaces are obtained. The "hydroxyl index" is the quantity of potassium per mg necessary for the neutralization of the free hydroxyls for 1 g of substance.

The acrylic polymerization primer which uses heat is, for example, benzoyl peroxide, alkyl perbenzoates, azo-bis-isobutyronitrile or other known primers. It is used in an amount of approximately 0.5 to 5% by weight of the acrylic compound.

The thin layer or film of coating is preferably formed on the flat horizontal support by depositing a solution of acrylic monomers and/or prepolymers, or acrylic polymers containing free hydroxyl groups, followed by evaporation of the solvents.

Appropriate solvents are, for example, simple hydrocarbons, halogenated hydrocarbons, or ketones. The polyurethane layer which is formed on the acrylic coating in accordance with the invention has been previously described in its general form. The component amounts of the polyurethane forming the layer are selected preferably so as to obtain a stoichiometrically balanced system, that is, the ratio of the equivalent NCO groups provided by the diisocyanate component to the equivalent OH groups provided by the polyol component is on the order of 1.

Suitable diisocyanates used within the framework of the invention are selected in particular from among the following difunctional aliphatic isocyanates: hexamethylenediisocyanate (HMDI), 2,2,4-trimethyl 1,6-hexanediisocyanate (TMDI), bis 4-(Hylene W), bis 3-methyl-4-isocyanatocyclohexylmethane, 2,2 bis (4-isocyanatocyclohexyl) propane, 3-isocyanatomethyl-3,5,5 trimethylcyclohexylisocyanate (IPDI), m-xylylenediisocyanate (XDI), m- and p-tetramethylxylylenediisocyanate (m- and p-TMXDI), cis-and trans-1,4-cyclohexane (CHDI), 1,3-(diisocyanatomethyl) cyclohexane (hydrogenated XDI).

An isocyanate component containing urea functions can be used. These urea functions improve certain mechanical properties of the layer. The amount of urea can represent up to approximately 10% of the total weight of the isocyanate component with urea functions. The amount of urea is preferably between 5 and 7% of the total weight of the component. For the reason mentioned above, 3-isocyanatomethyl-3,5,5 trimethylcyclohexyldiisocyanate containing urea functions (IPDI and derivatives) is preferably used.

Suitable long polyols are selected from among polyetherdiols or polyesterdiols with a molecular weight of 500–4000; the polyesterdiols are the esterification products of a diacid, such as adipic acid, succinic acid, palmitic acid, azelaic acid, sebacic acid or ophthalic acid, and a diol such as ethyleneglycol, 1,3-propanediol, 1,4-butanediol, 1,6hexanediol, polyetherdiols having the general formula H H O(CH$_2$)$_n$ $_m$ OH wherein n=2 to 6; m is such that the molecular weight is between about 500–4000 or polyetherdiols having the general formula

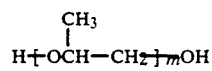

with m being such that the molecular weight is between about 500–4000. Polycaprolactonediols can also be used.

A polytetramethylene glycol (n=4) with a molecular weight of 1000 is preferably used.

The suitable chain extending agents are short diols with a molecular weight of less than approximately 300 and preferably less than 150, such as: ethyleneglycol, 1,2-propanediol, 1,3-propanediol, 1,2-, 1,3- or 1,4-butanediol, 2,2-dimethyl 1,3-propanediol (neopentylglycol), 1,5-pentanediol, 1,6-hexanediol, 1,8-octanediol, 1,10-decanediol, 1,12-dodecanediol, cyclohexanedimethanol, bisphenol A, 2-methyl 2,4-pentanediol, 3-methyl 2,4-pentanediol, 2-ethyl 1,3-hexanediol, 2,2,4-trimethyl-1,3-pentanediol, diethyleneglycol, triethyleneglycol, tetraethyleneglycol, 2-butyne-1,4-diol, 1,4-butenediol and decynediol, which may be substituted and/or esterified, hydroquinone-bis-hydroxyethylether, bisphenol A esterified by two or four groups of propylene oxide, dimethylolpropionic acid. In general, the shorter the diol, the harder the layer.

1,4-butanediol is preferably used which provides a good compromise for obtaining a layer which is neither too hard nor too flexible, which is desired for this type of application as an energy absorber.

The polyol component can contain a small amount of at least one polyol with a functionality of greater than 2 and, in particular, monomeric aliphatic triols, such as glycerol, trimethylolpropane, triols with polyether chains, polycaprolactone triols, with the molecular weight of said triols generally between 90 and 1000, or mixed polyether/polyether polyols with a functionality of greater than 2, for example a functionality of between 2 and 3. The addition of a polyol with a functionality of greater than 2 causes additional bridging bonds between the polyurethane chains and can thus further improve the cohesion of the layer.

The proportions of the long polyol, the short diol and optionally the polyol with a functionality of greater than 2 can vary depending on the desired properties. Proportions are generally selected such that for a hydroxyl equivalent, the long polyol represents approximately from 0.30 to 0.45 equivalent, the short diol approximately 0.2 to 0.7 equivalent, and the polyol with a functionality of greater than 2 approximately 0 to 0.35 equivalent.

The layer can also be produced by replacing part of the polyol component by a product with different active hydrogens, such as an amine.

In accordance with one embodiment of the plastic layer, the isocyanate component can contain in limited amounts, for example less than approximately 15% in NCO equivalent, at least one triisocyanate such as an isocyanate biuret or a triisocyanurate.

As described above, before forming the film of acrylic coating on the casting support, said support is coated with a separation agent. A suitable agent is, for example, that described in French Patent Publication No. 2,383,000 as a separation agent for the manufacture of a polyurethane layer on a glass support. This separation agent is an addition product modified with ethylene oxide.

In a surprising manner, this agent has shown itself to be fully adapted to the separation of the acrylic coating from a glass support.

The present invention will now be further illustrated by the following Examples which are provided for purposes of illustration and are not intended to limit the present invention.

EXAMPLE 1

On a movable glass support passing in a continuous manner, coated with a separation agent which is an addition product modified with ethylene oxide, a solution of the following composition was deposited using a roller:
1000 parts of hexanediol diacrylate
1500 parts of acetone
25 parts of azo-bis-isobutyronitrile as a primer for the heat polymerization of the acrylic monomers.

The deposited mixture was dried at 60° for approximately 2 minutes and a film having a thickness of approximately 2 microns was obtained.

In order to manufacture the polyurethane layer, the polyol component was prepared in advance by mixing a polytetramethyleneglycol with a molecular weight of 1000 (for example the product sold under the name Polymeg 1000 by QUAKER OATS) with 1,4-butanediol and a polyol with a functionality of greater than 2 (for example the product sold under the name Desmophen 1140 by BAYER), with the proportions of the components being such that the polytetramethyleneglycol provided 0.35 equivalent in hydroxyl groups, whereas the 1,4butanediol provided 0.55 and the polyol with a functionality of greater than 2 provided 0.10.

A stabilizing agent in an amount of 0.5% by weight of the total weight of the polyol component and of the isocyanate component, a sheeting agent in an amount of 0.05% by weight calculated in the same manner and a catalyst, dibutyltin dilaurate, in an amount of 0.03% by weight calculated in the same manner as above were incorporated into the polyol component.

The isocyanate compound used was 3-isocyanatomethyl-3,5,5-trimethylcyclohexylisocyanate (IPDI) having urea functions obtained by partial hydrolysis of the IPDI and having a content of NCO groups of approximately 31.5% by weight.

The components were taken in quantities such that the NCO/OH ratio was 1.

After degassing the components under a vacuum, the mixture brought to approximately 40° C. was poured using a pouring head such as the one described in French Patent No. 2,347,170, onto the previously formed acrylic film. In this manner a layer with a thickness of approximately 0.70 mm was formed which was subjected to a polymerization cycle consisting of heating for 2 hours at approximately 120° C.

During this cycle, polymerization of the hexanediol diacrylate also occurred to form an acrylic polymer which interpenetrated the surface of the polyurethane layer.

The plastic sheet formed by the polyurethane layer and the acrylic coating was then removed from the casting support.

The sheet was assembled with an annealed or tempered glass sheet to form a safety glazing, with the assembly being carried by arranging the surface of the polyurethane layer coated with the acrylic coating on the exterior in relation to the sheet of glass.

The sheet obtained and the glazing using same were subjected to the tests described below.

EXAMPLE 2

The method of Example 1 was repeated except that the hexanediol diacrylate was replaced with butanediol diacrylate in the acrylic composition, using the same proportions however.

The sheet of plastic material obtained after polymerization was easily detached from the casting support.

EXAMPLE 3

On a movable glass support passing in a continuous manner, coated with a separation agent which is an addition product modified with ethylene oxide, and using a roller, a 10% solution of a methacrylic resin (methacrylate) in methylethylketone having a hydroxyl index $I_{OH}$ of 50 and a dry extract of 60% in a mixture of 4 parts of xylene for 1 part of butyl acetate (methacrylic resin sold under the name DEGALAN VPLS 50 by the German company DEGUSSA) was deposited, with the deposited solution containing azo-bis-isobutyronitrile as a heat primer in an amount of 2.5% by weight of dry extract of the resin.

The deposited mixture was dried at 120° for 20 minutes and a film having a thickness of approximately 1 micron was obtained.

Then, as in Example 1, the polyurethane layer was formed on the acrylic film.

EXAMPLE 4

The method of Example 3 was repeated except the methacrylic resin with a hydroxyl index $I_{OH}$ of 50 was replaced by a methacrylic resin with a hydroxyl index $I_{OH}$ of 73.

EXAMPLES 5 TO 8

The method of Examples 1 to 4 was repeated, except that the ratio between the polyols of the polyol component was modified by using respectively 0.35, 0.45 and 0.20 OH equivalent for the polytetramethyleneglycol, the 1,4-butanediol, with the polyol having a functionality of greater than 2 being a polycaprolactonetriol (for example the product sold under the name NIAX 301 by UNION CARBIDE).

REFERENCE EXAMPLES

EXAMPLE 9

The method of Example 1 was repeated, except that an acrylic film with a thickness of 20 μm was formed on the casting support.

Another wear test showing the resistance of the layer to abrasion by solvents consisted of soaking the sample with cyclohexanone and subjecting it to 500 revolutions as in the preceding test.

The results of these abrasion tests are contained in the following table. The appearance of the sample was noted as:

Good: when the transparency of the sample was not affected by the test;
Average: when a slight blurriness was observed;
Bad: when the sample was scratched and it had lost its transparency.

| EXAMPLES | APPEARANCE OF THE SAMPLE AFTER 1000 REVS. DRY | APPEARANCE OF THE SAMPLE AFTER 500 REVS. IN THE PRESENCE OF CYCLOHEXANONE |
|---|---|---|
| 1 | GOOD | AVERAGE |
| 2 | GOOD | GOOD |
| 3 | GOOD | GOOD |
| 4 | GOOD | GOOD |
| 5 | GOOD | GOOD |
| 6 | GOOD | GOOD |
| 7 | GOOD | GOOD |
| 8 | GOOD | GOOD |
| 9 | BAD | BAD |
| 10 | GOOD | AVERAGE |
| 11 | BAD | BAD |
| 12 | BAD | BAD |

EXAMPLE 10

The method of Example 1 was repeated to form the polyurethane layer, except that the reaction mixture of components was poured directly onto the casting support coated with the separation agent, i.e., without having previously formed an acrylic coating layer.

After polymerization, the polyurethane layer was detached from the support and assembled with a glass sheet.

EXAMPLE 11

The method of Reference Example 9 was repeated, except that the glazing obtained was plunged into a bath having an identical composition to the acrylic composition deposited on the support in Example 1.

The tempering time was a few seconds.

After removal from the bath, the glazing was dried at 60° C. for 2 minutes and that the assembly was brought to 120° C. for 2 hours to carry out the polymerization of the acrylic coating.

EXAMPLE 12

The method of Example 1 was repeated, except that, prior to carrying out the pouring of the reaction mixture onto the acrylic layer, said layer was polymerized by bringing it to a temperature of 120° C. for 2 hours.

The polyurethane layers obtained in accordance with the examples were subjected to abrasion tests.

One of the abrasion tests was a wear test which is generally used to measure the wear-resistance of papers.

A sample of 12 cm in diameter obtained in accordance with the examples was placed on a turntable and a cotton material having a press weight of 1 kg was applied to the surface of the sample to be tested, that is to the surface treated with the acrylic coating. 1000 Revolutions were carried out on the sample. The sample was then removed from the apparatus and its surface state and its transparency were observed.

The results of this test show that the polyurethane layer obtained by reactive pouring onto a support previously coated with an acrylic coating having a small thickness has good resistance to abrasion.

When the coating is too thick, the abrasion resistance on the other hand is lowered in relation to the resistance shown by a non-treated layer.

When the coating is carried out by tempering the already polymerized layer of plastic in an acrylic bath, no improvement in abrasion resistance is observed; to the contrary a deterioration in optical quality is observed.

The polyurethane layer in accordance with the invention, combined or not with one or several layers of plastic is preferably used as the external layer of a laminated glazing comprising a glass or plastic support, with the surface of the layer containing the acrylic polymer facing the exterior of the glazing.

Having now fully described the present invention, it will be apparent that many changes and modifications can be made thereto without departing from the spirit or scope of the invention as set forth herein.

What is claimed as new and desired to be secured by Letters Patent of the United States is:

1. A high optical quality transparent plastic sheet comprising a polyurethane layer formed by reactive pouring or reactive pulverization onto a flat horizontal support of a reaction mixture comprising a polyol component and an isocyanate component, wherein the surface of the polyurethane layer which faces the support during the formation of the layer contains an acrylic polymer resulting from contacting, during deposition of the reaction mixture, said reaction mixture with a thin acrylic layer deposited in advance on said support, wherein said acrylic polymer and the polyurethane of said surface of said polyurethane layer are interpenetrated.

2. A laminated glazing, comprising (a) a support which is one member selected from the group consisting of a monolithic glass support, a laminated glass support, a monolithic plastic support, and a laminated plastic support, and (b) a plastic sheet comprising a polyurethane layer formed by reactive pouring or reactive pulverization onto a flat horizontal support of a reaction mixture comprising a polyol component and an isocyanate component, wherein the surface of the polyurethane layer which faces the support during the formation of the layer contains an acrylic polymer resulting from the contacting, during deposition of the reaction mixture, said reaction mixture with a thin acrylic layer deposited in advance on said support, wherein said acrylic polymer and the polyurethane of said surface of said polyurethane layer are interpenetrated, wherein said plastic sheet is laminated on said support such that said acrylic polymer faces the exterior of said glazing.

3. A method for the manufacture of a high optical quality transparent plastic sheet comprising a polyurethane layer obtained by reactive pouring or reactive pulverization onto a flat horizontal support of a reaction mixture comprising a polyol component and an isocyanate component, with the surface of the polyurethane layer in contact with the casting support containing an acrylic polymer, wherein said process comprises:
   (a) depositing a separation agent onto a casting support;
   (b) depositing monomers or acrylic prepolymers or acrylic polymers containing free hydroxyl groups onto the separation agent so as to form a thin acrylic coating;
   (c) depositing a reaction mixture capable of forming a polyurethane layer onto the acrylic coating by pouring or pulverization;
   (d) polymerizing the assembly; and
   (e) removing the formed polymerization polyurethane layer combined, with the acrylic coating from the casting support wherein the acrylic polymer and the polyurethane of the surface part of the polyurethane layer are interpenetrated.

4. The method in accordance with claim 3, wherein the acrylic monomers, propolymers or polymers are deposited onto the separation agent in the form of a solution and the solvent is evaporated by drying before the deposit of the reaction mixture capable of forming the polyurethane layer.

5. The method in accordance with claim 4, wherein the solution contains a polymerization activator for the acrylic monomers or prepolymers or for the acrylic polymers containing free hydroxyl groups.

6. The method in accordance with claim 3, wherein the acrylic polymers containing free hydroxyl groups are methacrylic resins with a hydroxyl index of less than 100.

7. The method in accordance with claim 3, wherein the acrylic coating formed on the casting support has a thickness of less than approximately 10 $\mu$m.

8. The method in accordance with claim 3, wherein the polymerization cycle is carried out at a temperature of between 80° and 160° C.

9. The method in accordance with claim 8, wherein the polymerization cycle consists of bringing the assembly to a temperature of 120° C. for approximately 2 hours.

10. The method in accordance with claim 3, wherein said isocyanate component is selected from the group consisting of hexamethylene diisocyanate, 2,2,4-trimethyl-1,6-hexane diisocyanate, bis 4-isocyanatohexyl-methane, bis 3-methyl-4-isocyanatocyclohexyl-methane, -2,2-bis (4isocyanatocyclohexyl) propane, 3-isocyanatomethyl-3,5,5-trimetyl-cyclohexylisocyanate, m-xylenediisocyanate, m- and p-tetramethylxylylenediisocyanate, cis- and trans-1,4-cyclohexane, 1,3-(diisocyanatomethyl) cyclohexane.

11. The method in accordance with claim 10, wherein said isocyanate contains up to about 10% by weight of urea functions.

12. The method in accordance with claim 11, wherein said isocyanate contains about 5 and 7% of the total weight of urea functions.

* * * * *